Nov. 3, 1936. J H. SMITH 2,059,496
TOOL AND TOOL HOLDER
Filed June 8, 1934
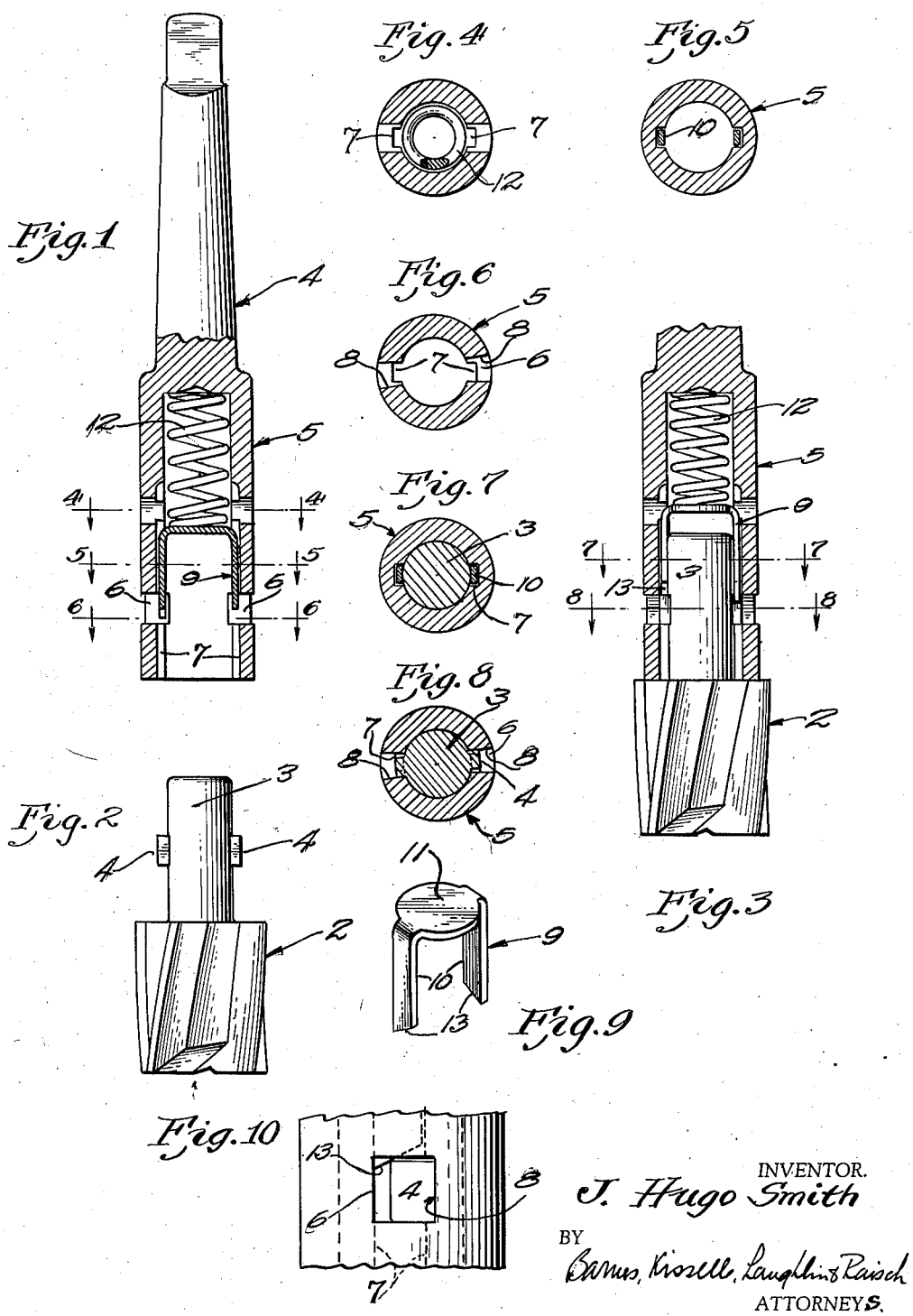
INVENTOR.
J. Hugo Smith
BY
ATTORNEYS.

Patented Nov. 3, 1936

2,059,496

UNITED STATES PATENT OFFICE 2,059,496

TOOL AND TOOL HOLDER

J Hugo Smith, Detroit, Mich.

Application June 8, 1934, Serial No. 729,589

5 Claims. (Cl. 279—93)

This invention relates to a tool and tool holder, and has to do particularly with a novel arrangement of the interfitting parts of a tool and tool holder whereby to permit quick, easy assembly and disassembly, together with positive locking of the two parts.

More specifically, it is an object of the invention to provide a tool and tool holder, the interfitting and interlocking parts of which are easily fabricated, and more particularly, the driving surfaces of which are such as to eliminate substantially all tendency of the tool or tool holder to split or jam. In this connection, the driving surfaces of the socket member are symmetrically arranged and so positioned relative to the driven member that the shank is radial to the axis of the tool and tool holder whereby jamming of the two parts and substantially all tendency to split at the two corners of the tool and tool holder is thus eliminated.

A further feature of the invention has to do with the locating of the driving surfaces and holding surfaces in the same plane and the fact that the driving surface has little or no relationship, as far as size is concerned, with the lugs or driven surfaces of the tool member. A still further specific feature is the provision of a direct spring action constantly tending to force the driven surface against the driving surface so as to give a positive solid connection and prevent the tool from chattering or oscillating.

Other features of the invention have to do with the various structural details of the tool and tool holder, including a resilient means tending to automatically twist the tool about its longitudinal axis, in addition to maintaining the positive contact between the driven member and the driving surface, as will be more clearly set forth in the specification and claims.

In the drawing:

Fig. 1 is an elevation, partly in section, of one form of tool holder embodying the present invention.

Fig. 2 is a detail view of a tool for insertion in a tool holder, showing particularly the manner of positioning and arranging the outwardly extending lugs of the shank of the tool.

Fig. 3 is a view similar to Fig. 1 but showing the tool inserted in locking position in the holder, the resilient plunger pressing against the lugs of the tool to hold the same in driving position.

Figs. 4, 5 and 6 are sectional views taken on lines 4—4, 5—5, and 6—6, respectively, of Fig. 1.

Figs. 7 and 8 are sectional views taken on lines lines 7—7 and 8—8, respectively, of the combined tool and holder as shown in Fig. 3.

Fig. 9 is a perspective view of the plunger.

Fig. 10 is a fragmentary elevational view illustrating the interlocking arrangement between the spring pressed plunger, a driven lug, and the driving surface of the tool and holder.

The illustrated embodiment of my invention is by means of a more or less conventional form of tool and tool holder. It will be understood that various interfitting socket and shank arrangements may be utilized in forming the holder and tool therefor and still come within the confines of the present invention; this, of course, also applies to different types of tools.

One form of tool is shown as at 2 and in the illustrated embodiment this has a shank 3 and a pair of oppositely disposed lugs 4 which serve as driven members. A tool holder has a hollowed out lower end forming a cylindrical socket member 5 for receiving the shank 3 of the tool. This socket member 5 is slotted as at 6 entirely through the wall thereof so as to make it possible to provide a clean cut square driving surface. The slot or aperture 6, as best shown in Fig. 6, is of such width relative to grooves 7 that such aperture forms a bayonet slot for receiving the lugs when the tool is in the position shown in Fig. 3; in other words, looking at Fig. 6, it will be seen that if the tool is shoved up within the socket 5 the lugs will slide within the grooves 7 until the bottom end of the lug has reached a point above the lower edge of the slot 6, at which time the tool may be turned to the right with the result that the bayonet slot 6 locks the tool in position as long as the lugs are held against the driving surfaces 8, see Fig. 8.

It will be seen that the radial depth of the driving surfaces 8 has no relationship, as far as driving is concerned, with the depth of the lugs. The important thing here is the fact that the driving surfaces 8 are substantially radial to the axis of the tool and tool holder so that if there is any break down of the tool it will be because of a direct shearing action shearing the lugs directly away from the shank 3 of the tool. This is in direct contradistinction to many other types of tool and tool holders where the plane of the driving and driven surface is substantially at right angles to the radius of the tool and tool holder instead of radial thereto. It will further be seen here that there is no possibility whatsoever of a jamming action between the tool and tool holder, the same being true of any tendency of the socket member 5 to split.

Although not necessary, it is preferable to have the driving surfaces 8 substantially radial. While the surfaces 8, as will best be seen in Figs. 6 and 8, are slightly off the center line, nevertheless the action is substantially radial so as to provide a square contact with the driven members, or the lug members of the tool.

In order to hold the driven surfaces of the lug members snugly up against the driving surfaces 8 at all times, I have provided a plunger 9 having leg members 10 of such a size as to slide within a continuation of the grooves 7; in other words, the grooves 7 at the lower end of the tool holder accommodate the lugs whereas the grooves 7 above the bayonet slot 6 accommodate the leg members 10 of the plunger 9. Thus the lower grooves 7 accommodate the plunger and assembly thereof and the upper grooves 7 permit the resilient action of the plunger relative to the shank of the tool. The upper end of the plunger 9 is formed as at 11 to provide a bearing surface for a coil spring 12 and the lower ends of the legs 10 are tapered as at 13 so as to give an inclined plane effect against an upper edge of each lug member, as best illustrated in Fig. 10. The plunger 9 is, of course, prevented from rotating by the grooves 7.

Retaining means for the plunger 9 are not important in the present invention, the important thing being that the spring 12 is of such length and strength as to cause the tapered portions 13 of the plunger to contact with the upper edges of the lugs, preferably just prior to the time that the lower edges of the lugs clear the lower edge of the bayonet slot 6. This is not necessary, but is highly desirable as it gives the tool an automatic twisting action so that it is necessary for one only to normally shove the shank 3 of the tool longitudinally of the tool holder and as the lugs contact with the prongs of the plunger 9 they will be automatically twisted into locked position, or that position shown in Figs. 3 and 10. The downward resilient action of the plunger and the tapered surfaces 13 will, of course, maintain the driven surface of each lug member tightly up against each driving surface 8 with the result that the tool will not chatter or oscillate regardless of the type of work to which the tool is subjected. Chattering or oscillating tools have a tendency to rapidly wear down the cutting edge and often result in breakage of the lug members or other parts of the tool.

As the driving and driven surfaces of the tool and tool holder are substantially radial and as the plunger maintains constant contact between said surfaces, all tendency to wear due to pounding action is eliminated; even if there should be any wearing it would be even and would not tend to jam the two parts. Although the downward resilient action of the plunger is sufficient to maintain its contact between the driving and driven surfaces it is, nevertheless, very easy to disengage the tool from the tool holder by oscillation of the same in the opposite direction, or to the left as viewed in Fig. 10.

What I claim is:

1. A tool and holder therefor, comprising a holder member formed with a socket, a tool member having a shank for engagement with said socket, the shank of said tool member having a laterally projecting formation and said socket member having a bayonet slot formation for receiving the laterally projecting formation of the tool member in sliding relation and permitting relative rotation of the tool member and socket member to secure the tool against longitudinal movement when rotated, said slot formation of the socket member having one wall functioning as a driving means and the lateral formation on the shank of the tool member having a wall functioning as driven means, and spring means having a cam surface for wedgingly engaging directly against a portion of said lateral formation on the shank of the tool member for constantly holding the driving and driven means in engagement while said tool and holder are in interfitting working relationship.

2. A tool and holder therefor, comprising cooperating elements forming a part of each whereby they may be moved relatively in longitudinal alignment, an opening formed in the holder and extending entirely through the wall thereof to form a square shoulder extending substantially radially of the holder to receive one of the cooperating elements of the tool in locking position, and means for contacting directly with said last named cooperating element tending to at all times hold the same in contacting relationship with said square shoulder as long as said tool and holder are in assembled working relationship.

3. A tool and holder therefor, comprising cooperating elements forming a part of each whereby they may be moved relatively in longitudinal alignment, an opening formed in the holder and having a wall thereof fabricated to form a square shoulder extending substantially radially of the holder to receive one of the cooperating elements of the tool in locking position, and means within the outer contour of said holder for contacting directly with said last named cooperating element tending to at all times hold the same in contacting relationship with said square shoulder as long as said tool and holder are in assembled working relationship.

4. In a tool and holder combination of the type having a tool member detachably mounted in a holder member and adapted to be driven thereby, comprising one member having a bayonet slot formation and the other member having a laterally projecting formation for cooperation with the slot formation, the slot formation in one member having a face adapted to abut against a face of the laterally extending formation on the other member to provide a driving contact, and spring means associated with one member and adapted upon assembly of the two members to directly engage a portion of said formation on the other member for holding the faces of said slot formation and said projecting formation in driving engagement at all times while said tool and holder remain in operative assembled relationship.

5. A tool and holder therefor, of the type having a tool member detachably mounted on said holder member and adapted to be driven thereby, comprising one member formed with a socket and the other having a shank for engagement with said socket, the socket member having a bayonet slot formation formed therein including a pair of opposed walls extending substantially radially to the axis of the socket member and functioning as driving means, the shank being provided with opposed laterally projecting formations including opposed walls extending substantially radial to the axis of the shank and functioning as driven means, the bayonet slot formation cooperating with a part of the laterally projecting formations on said shank to receive and hold the shank member in assembled relation relative to the socket member, and spring means carried by said socket member and having a cam surface adapted to wedgingly engage directly against a portion of said formation on the shank member for constantly holding the driving and driven means in engagement.

J HUGO SMITH.